May 4, 1937.  H. L. McQUISTON  2,079,517
METHOD OF SEALING OFF POROUS FORMATIONS IN WELLS
Filed Jan. 14, 1935  2 Sheets-Sheet 1
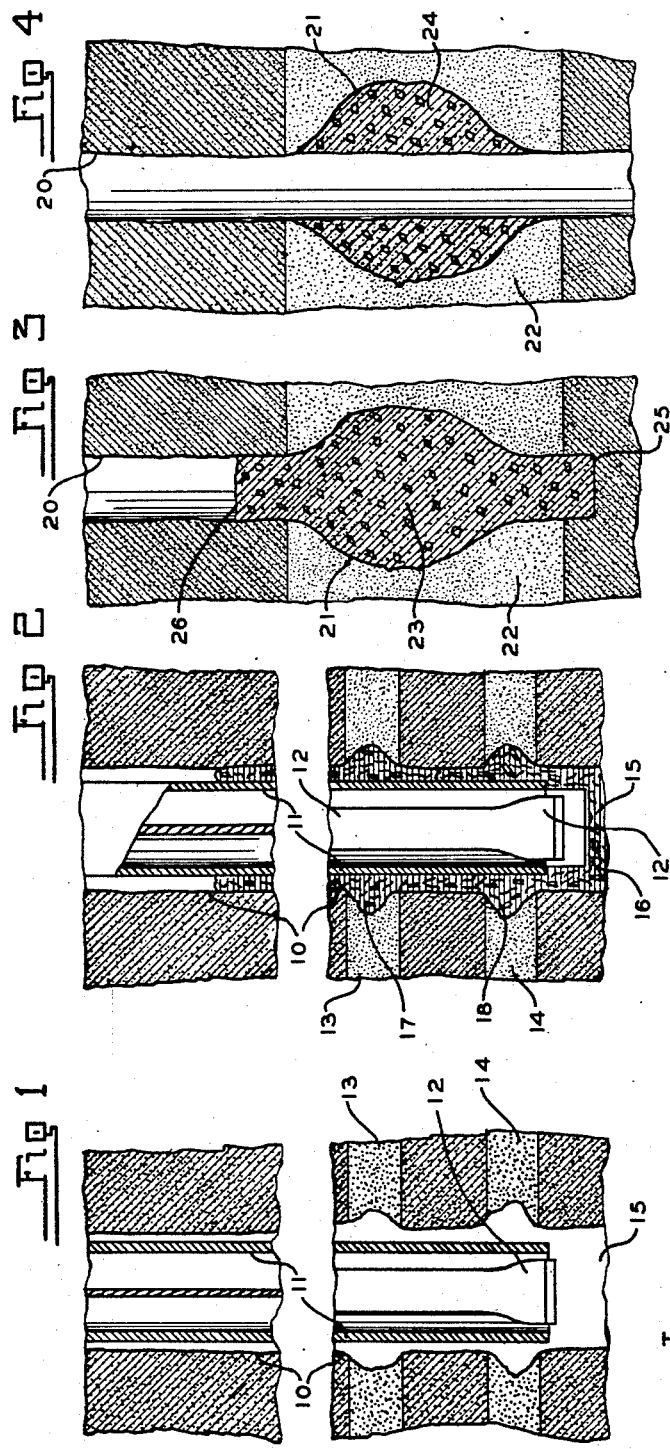
INVENTOR.
HORACE LOWRY McQUISTON
BY
ATTORNEYS.

May 4, 1937.  H. L. McQUISTON  2,079,517
METHOD OF SEALING OFF POROUS FORMATIONS IN WELLS
Filed Jan. 14, 1935  2 Sheets-Sheet 2
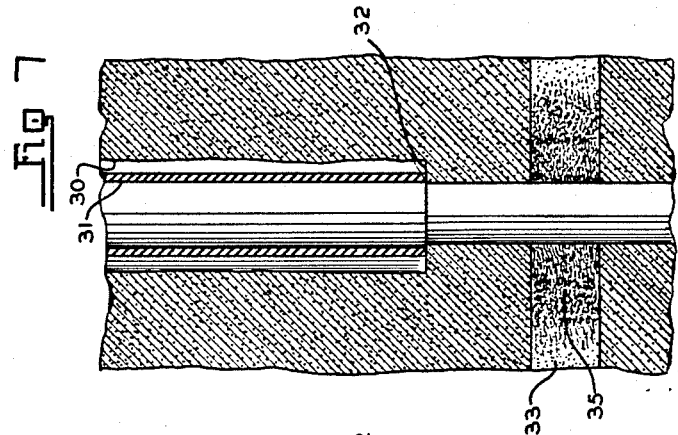
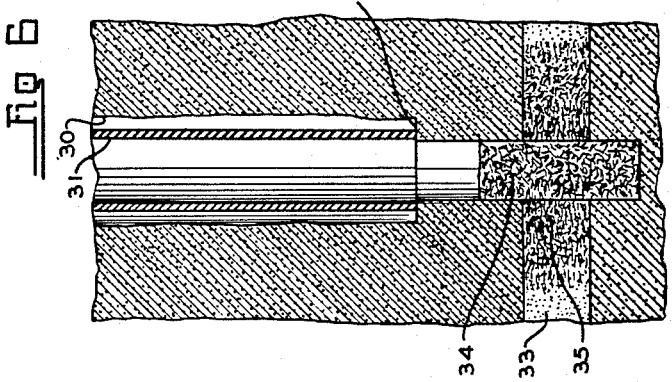
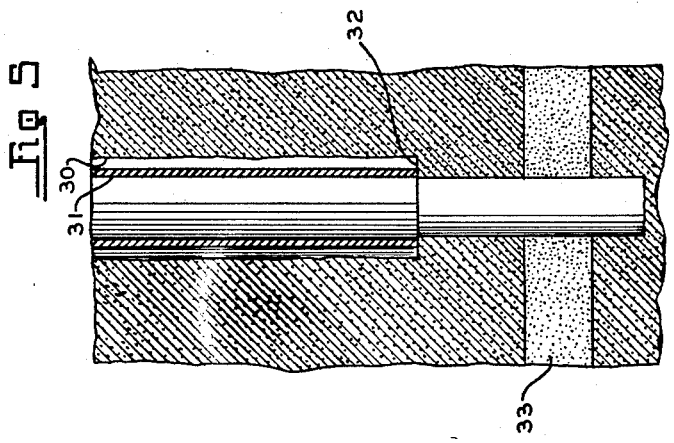
INVENTOR.
HORACE LOWRY McQUISTON
BY
ATTORNEYS.

Patented May 4, 1937

2,079,517

UNITED STATES PATENT OFFICE 2,079,517

METHOD OF SEALING-OFF POROUS FORMATIONS IN WELLS

Horace Lowry McQuiston, Oklahoma City, Okla., assignor to Phillips Petroleum Company, a corporation of Delaware Application January 14, 1935, Serial No. 1,776

2 Claims. (Cl. 166—21)

This invention relates to an improved method of sealing well holes to prevent leakage, and in particular relates to the sealing of certain portions of well holes and casing seats.

More specifically this invention relates to the drilling of well holes and the sealing off therefrom of porous formations containing water, gas, or oil encountered while drilling and to the sealing off of dry porous formations into which oil, gas, or water may migrate as the result of penetrating other porous formations and to the sealing off of casing seats to prevent leakage of oil, gas, or water into the hole after the pipe has been run and drilling resumed.

In the drilling of well holes, including oil wells, porous formations and strata are encountered as the hole is sunk. Frequently these porous strata contain or have present adjacent thereto deposits of water, gas or oil. If liquids or gases are present in such formations it will flow into the hole and frequently disturb the well walls and cause large cavities. When gas strata are encountered there is danger that the pressure thereof will build up and cause a blow out, thus entirely ruining the well hole. Aside from these, there are other dangers incident to such a blow out and other evils are caused by gas flowing into the hole. Often porous formations carrying oil, gas, or water are encountered at a relative shallow depth while drilling and it is desired to seal off these formations on the outside of the pipe to eliminate the migration of oil, gas, or water into the well hole.

The object of this invention is to seal wells during drilling operations against the encroachment or migration of such fluid substances normally encountered as are detrimental to drilling progress and which delay such operations and otherwise cause conditions tending to ruin the drill hole.

Another object of this invention is to seal off porous formations behind the pipe or casing when the migration of oil, gas, or water creates a waste and hazard. Liquids and gases are subjected to the laws of gravity and will migrate into porous formations of greater porosity and lower rock pressure. The migration of water into oil or gas formations lessens their potential value. The sealing off of gas formations behind pipe casings eliminates the hazard of gas blow outs and waste.

Another object of this invention is to effectively seal well holes behind the casing in such a manner that if later it is desired to recover all or a portion of the pipe and produce the oil or gas from the formations penetrated when drilling the well hole, it can readily and efficiently be accomplished.

Another object of this invention is to effectively seal well holes during drilling operations against the encroachment of such substances as water, gas, and oil in such a manner that if it is later desired the flow of water, gas, or oil into the well can be readily and easily effected.

Still another object of this invention is to effectively seal well holes against leakage in such a manner that the seal created over the producing formation can easily and conveniently be removed.

A further object of the invention is to provide a positive pipe seal in wells and well hole bottoms to prevent the encroachment of fluids into the well and yet allow the pipe to be easily lowered or raised.

A still further object of this invention is to provide a seal between the outside of the casing pipe and the walls of the well hole to protect the casing pipe from corrosion.

A still further object of this invention is to effectively seal off from the well hole any detrimental deposits tending to cause corrosion and to seal off strata containing water, oil, or gas which are encountered during the drilling operations and so positively prevent the same from migrating into formations or any part of the well hole.

A still further object of this invention is to effectively fill up caved places in holes, which cause hazards and retard drilling, with a seal which can later be drilled out to the size of the hole desired.

It is therefore desirable to be able to effectively seal off from the well hole any deposits or strata containing water, gas, or oil which are encountered during the drilling operations, and the sealing off of such deposits and positively preventing the same from leaking or migrating into the well hole constitutes a major object of this invention.

Other objects and advantages and a more complete appreciation of this invention will be had from a consideration of the following specification and attached drawings forming a part thereof, wherein:

Fig. 1 is a vertical cross-sectional view of a well hole drilled by the cable tool method, showing a casing pipe inserted in the hole and the drilling tool.

Fig. 2 is cross-sectional view of a well hole similar to that illustrated in Fig. 1 and shows a further step in the drilling operation and the method of sealing the hole against the encroachment or migration of fluids and so prevent cavings, and also to form a positive casing seat to prevent fluid from entering the hole below the pipe seat.

Fig. 3 is a vertical cross-sectional view of a well hole wherein a cavity has developed and been sealed.

Fig. 4 is the same well hole as that illustrated in Fig. 3 but shows the hole after drilling has been resumed.

Fig. 5 is a vertical cross-section view of a well hole wherein a porous liquid bearing strata has been encountered.

Fig. 6 is the same well hole illustrated in Fig. 5 showing the method of sealing off the porous strata, and;

Fig. 7 is the same well hole illustrated in Figs. 5 and 6 showing the sealing off of the porous strata completed and the drilling operations resumed.

When porous formations or strata bearing gas, oil, or water are encountered, the fluid from such strata have a tendency, due to the natural pressure and porosity thereof, to seep into the well hole between the pipe casing and the side walls of the hole, and such conditions present numerous evils difficult to overcome. The presence of liquids or gases in the well hole will disrupt or agitate the side walls of the same and possibly cause the hole to cave. If gas is encountered considerable natural pressure exists and will cause extremely dangerous conditions. Under certain conditions, oil bearing strata will be encountered at a relatively shallow depth, and it is desired to protect this strata from a conservation viewpoint, as it may be advantageous at a later date to develop and produce oil from such sands. Furthermore, it is desired to prevent the encroachment of certain liquids into the well hole in order to protect the pipe from corrosion. Oftentimes cavities occur during the drilling operation and the same must be efficiently sealed up to prevent the entire well hole from caving in, yet the sealing medium used must be such as to permit drilling therethrough and of such nature to allow the casing pipe to be easily raised or lowered as desired.

By considering the brief review of the evils incidental to drilling a well hole through gas, oil, or water bearing strata, it will be appreciated that some positive and effective means is necessary to seal the well hole against the encroachment and migration of such fluids as those described in order that the drilling operations may be more advantageously developed.

In the operation of drilling well holes with cable tools, there is produced a well hole such as the one shown in Fig. 1 and designated by the numeral 10. At certain stages in the drilling operation there is inserted into the hole a pipe or casing 11. The hole is produced or drilled by the bit 12 and is shown as having passed through or encountered the strata 13 and 14.

The bottom of the hole 15 is slightly lower than the porous strata 13 and 14 from which such a substance as gas, oil, or water may seep into the well hole or migrate from one formation to another and then into the hole, depending on their rock pressure and porosity. This is detrimental to conservation and to investment and otherwise causes conditions detrimental to drilling.

In order to positively seal the porous formations, protect the walls of the hole from caving, stop corrosion and provide a pipe seal at the casing seat, it has been found that when certain sealing mediums of the type hereinafter to be disclosed are introduced into the well hole under pressure, or with presure subsequently applied thereto that the sealing component thereof due to the pressure thereon will be forced back into the numerous interstices of the gas, oil, or water bearing stratum and being held in place by the pressure referred to will positively and effectively seal and guard the well hole against migration and seepage of the oil, gas, or water.

It has been found that a sealing medium comprising a vehicle and a sealing agent, and in some instances a binder or cement, will serve to efficiently seal porous formations to prevent oil, water, or gas from leaking or migrating into the well hole, or from one stratum to another and then into the well hole. Liquid vehicles to carry the sealing medium to the points of application have proven satisfactory, and in particular it has been found advantageous to use such liquids as oil, water, mud, mud and water, and mixtures thereof.

The sealing agent should be some substance which is readily absorbent, or which is capable of matting and thereby closing up or sealing relatively large crevices. Of the first type of sealing agents it has been found that ground, shredded, or comminuted paper, or paper pulp of vegetable origin will readily absorb water and most other liquids and when used with such vehicles as those above described serve to seal the crevices of porous underground strata above referred to. Rope fibers, such as hemp, and manila, rags and hair may be used separately with a vehicle such as water or oil, or may be used together with such water absorbent sealing agents as paper pulp. In either event the fibers have a tendency to mat and are beneficial in sealing large crevices.

Various other substances such as paper and pulpy matter of vegetable, animal or mineral origin may be used as a sealing agent either separately or together with fibrous materials of either vegetable, animal or mineral origin. Of these latter substances it may sometimes be desirable to use amphibole, sepentine or other asbestos-like fibers.

In addition to the vehicle, such as oil, or water, and the sealing agent, such as paper or fibers, it has been found necessary in some instances to use a cement or binder which may be ordinary cement, glue, or other such gelatinous substances as aqua-gel.

In the preferred embodiment of the sealing medium and in the methods hereinafter described, there is used a vehicle such as water together with sufficient quantities of paper, or paper pulp, and a fibrous substance such as fibers from corn or sugar cane stalks, or a mineral fiber. A sealing medium consisting of the above described constituents may be admixed in any suitable proportions so long as it can still be conveniently handled by the ordinary pumping apparatus used for circulating fluid in a well hole.

In one embodiment of the present invention, when such a stratum containing substances as above described are encountered, it has been found necessary to lower into the well and suspend from the bottom 15 of the hole a casing pipe such as that shown in full lines by numeral 11 in Fig. 1. The sealing medium is then dumped into the casing pipe in a sufficient quantity so as to completely cover the bottom of the hole 15 and the side wall portions thereof adjacent the porous strata which are to be sealed off from the well hole. Pressure is then applied to force the sealing medium into place and is designated by the numeral 16 in Fig. 2, and is shown placed in the well to effect the sealing desired. It will be noted that a portion of sealing medium is forced a considerable distance into the porous strata 13 and 14 to seal the same as shown at 17 and 18 in Fig. 2.

When the sealing medium is placed in the hole by dumping and allowed to flow thereinto by gravity, it is then necessary to apply pressure in order that the sealing medium containing the sealing agent will be forced back into the interstices of the stratum and be held in position. In lieu of applying the seal in this manner, the same may be positively pumped into the hole under considerable pressure and the sealing medium placed and held in position by means of the pressure which forces it down into the well hole.

It is necessary in most instances to suspend the casing within the well hole and hold the lower end thereof out of contact with the bottom of the hole. The casing may be lowered into the hole and allowed to rest on the bottom thereof, after which the sealing medium is introduced and applied in substantially either of the manners as above described. The well hole will not form a flush fitting with the lower end of the casing and when pressure is applied within the pipe the sealing medium, including the sealing agent such as paper, will be forced back into the stratum, from which it is desired to prevent the migration of oil, gas, or water into the well.

The sealing medium used in the above operation is of a moderate consistency and will not readily solidify. This characteristic of the sealing medium allows the pipe to be readily removed if desired. After the casing has been lowered to seat on the bottom of the hole 15 and the strata 13 and 14 have been sealed off from the hole in the manner described and illustrated in Fig. 2, the drilling operation may be continued.

It will thus be seen that strata from which fluids migrate into the well hole, or from one to another have been positively sealed and all leaks and seepage from such strata into the hole prevented. In some instances it may be feasible to entirely remove the sealing medium and due to its peculiar nature this can be readily effected by raising and pulling the pipe, or by treating the seal with acids or caustic solutions which will disintegrate certain components of the sealing medium, which portions thereof serve to seal the crevices through which the fluids migrate from one strata to another.

It will also be seen that with the sealing medium in place on the outside of pipe 11 that a protective coating surrounds the pipe from top to bottom thus preventing corrosion and deterioration of the pipe, and yet the same can readily be removed from the hole when desired.

In Fig. 3 there is illustrated a cave formation 21, which has been encountered while drilling the hole 20 through the strata 22 and which has been found detrimental to further drilling operations. In such instances the hole, both below and above the cave is filled with a filler 23, such as paper, pulp, or the like mixed with a binding medium such as cement. After hardening of the filler the hole can be redrilled, leaving the filler or sealing medium in place as is shown in Fig. 4 by numeral 23.

The sealing medium is placed in the hole by a bailer or container until the required amount is in place. The filler or sealing medium may also be pumped into place by lowering a small pipe, such as tubing, to the point 25 shown in Fig. 3 and after pumping the desired amount of seal into place the tubing is raised to about point 26 and pumping continued until all excess filler is pumped out of the hole. Pumping the excess filler out of the hole eliminates the expense of drilling out the filler after it has set. The pipe is then removed, the filler allowed to set, and then drilling resumed.

From the above it can be seen that a seal such as paper and a binder is both advantageous and desirable for use in filling well hole cavities.

In Fig. 5 there is illustrated a well hole 30 with a casing pipe 31 lowered and in place on a seat 32. In further drilling of the well hole a porous formation or stratum 33 has been encountered which contains water, gas or oil. To remedy this condition, a sealing medium, preferably paper, cement, and water, is pumped into the well hole and forced into the formation or stratum under pressure to assume the position within the well hole as at 34, and within the stratum as at 35 as shown in Fig. 6.

After the sealing medium has been placed in the well hole as shown in Fig. 6 the medium is preferably allowed to set for a short period of time after which drilling operations may be resumed. Fig. 7 shows the well hole after the surplus sealing substance 34 has been drilled out leaving only the portion 35 which has been forced by pressure back into the porous stratum to seal the same against the escape therefrom of oil, gas, or water into the well hole.

I claim:

1. The method of filling cavities in the walls of well holes during drilling operations, which comprises filling the cavities with a sealing medium of a setting cement slurry and ground paper admixed in suitable proportions, allowing the cement with the paper contained therein to set, and drilling through any of the sealing medium obstructing the well hole.

2. In drilling well holes through porous fluid bearing strata the method of preventing the fluid of the strata from leaking into the well hole which comprises introducing a sealing medium of a setting cement slurry and ground paper to the surface of the porous fluid bearing strata facing the well hole, and applying pressure thereunto to force the sealing medium into the strata to seal the fluid therein against leakage into the well hole.

HORACE LOWRY McQUISTON.